(12) United States Patent
Tanaka et al.

(10) Patent No.: US 6,751,180 B2
(45) Date of Patent: Jun. 15, 2004

(54) DISK PLAYER

(75) Inventors: Shinsaku Tanaka, Tokyo (JP); Takashi Yamanaka, Tokyo (JP); Toshio Yoshimura, Tokyo (JP); Shigeru Akatani, Tokyo (JP); Takashi Kouso, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 259 days.

(21) Appl. No.: 10/054,999

(22) Filed: Jan. 25, 2002

(65) Prior Publication Data
US 2002/0100337 A1 Aug. 1, 2002

(30) Foreign Application Priority Data
Jan. 26, 2001 (JP) ........................................ 2001-018746

(51) Int. Cl.[7] .............................................. G11B 33/02
(52) U.S. Cl. ..................................................... 369/77.1
(58) Field of Search ................................ 369/77.1, 263, 369/75.2, 247; 360/97.02, 99.06, 99.07

(56) References Cited

U.S. PATENT DOCUMENTS 5,596,561 A * 1/1997 Toyoguchi .................. 369/77.1

FOREIGN PATENT DOCUMENTS

| JP | 2000-48445 | 7/1998 |
| JP | 2002-298482 A | * 10/2002 |

* cited by examiner

Primary Examiner—Julie Anne Watko
(74) Attorney, Agent, or Firm—Reed Smith LLP; Stanley P. Fisher, Esq.; Juan Carlos A. Marquez, Esq.

(57) ABSTRACT

When a roller holder attached to a floating chassis of the disk player rotates to raise a carrier roller from a disk non-carrying position to a disk carrying position, a convex portion of the roller holder is engaged with concave portions of the main chassis from above so as to fix the floating chassis to the main chassis in the back and forth directions as well as the right and left directions. The roller holder further rotates about a fulcrum to raise the floating chassis. As a result, the floating chassis is made to abut against another part of the main chassis from below to fix the floating chassis to the main chassis in the vertical direction.

3 Claims, 6 Drawing Sheets

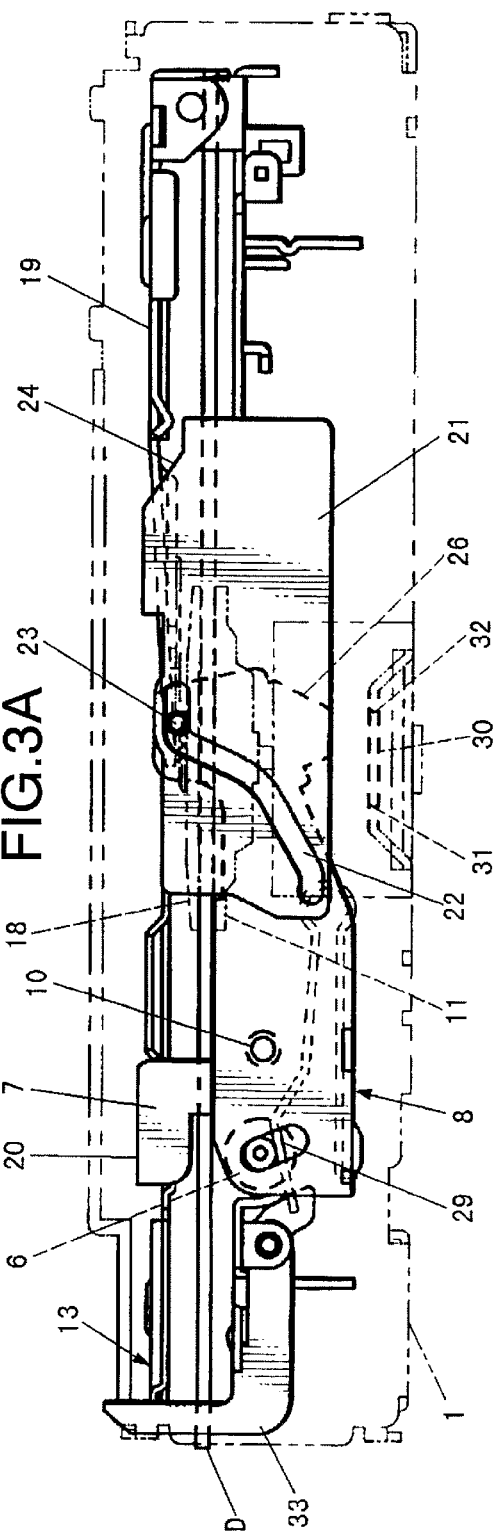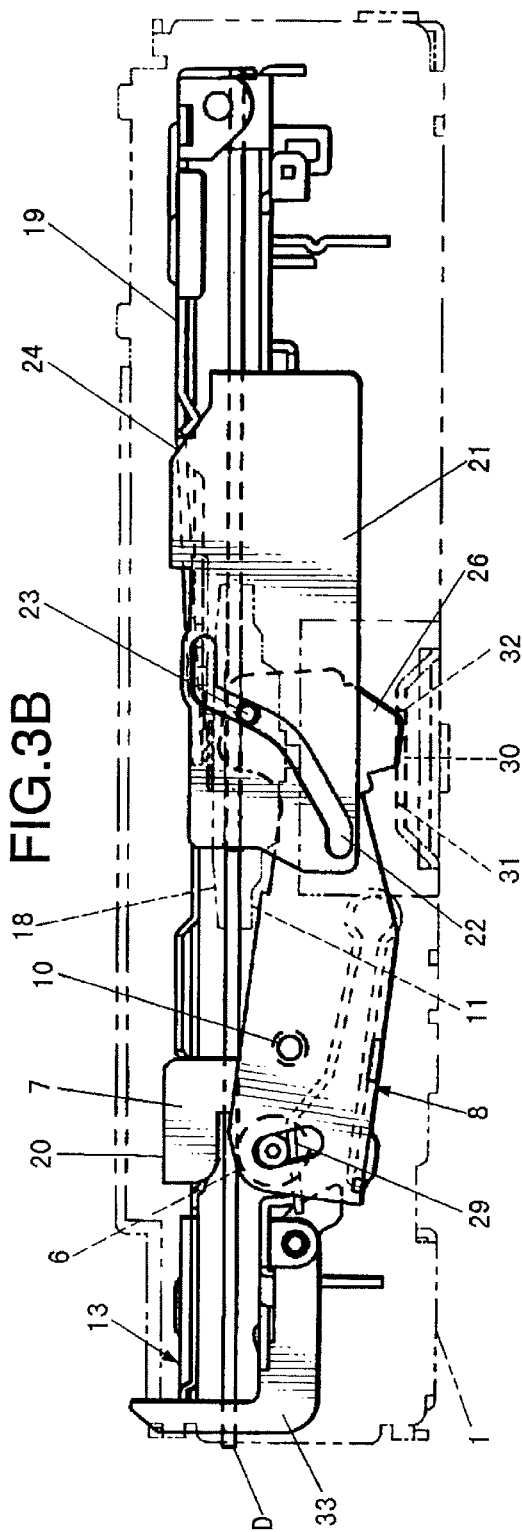

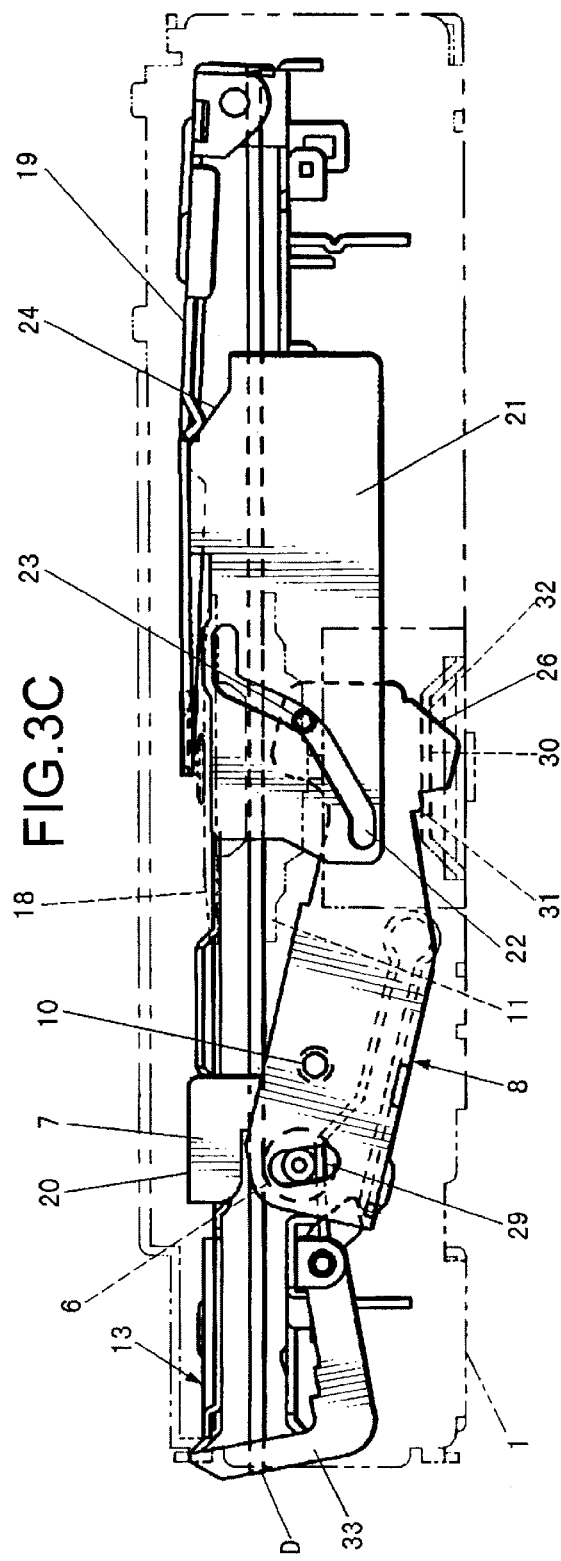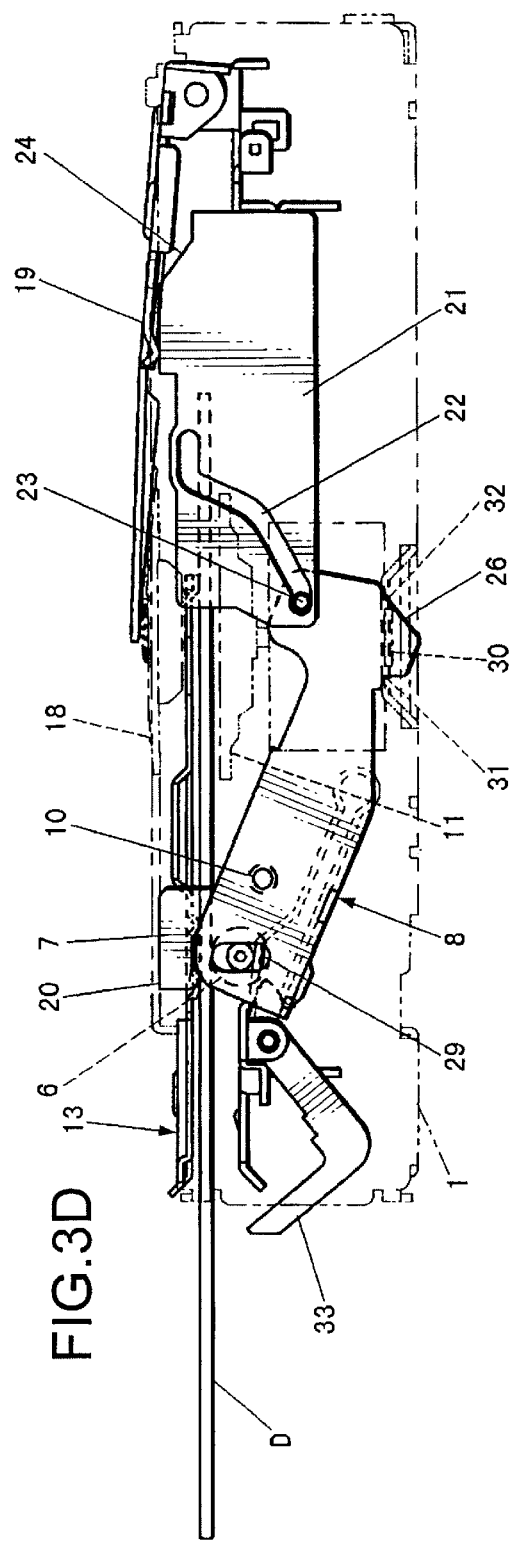

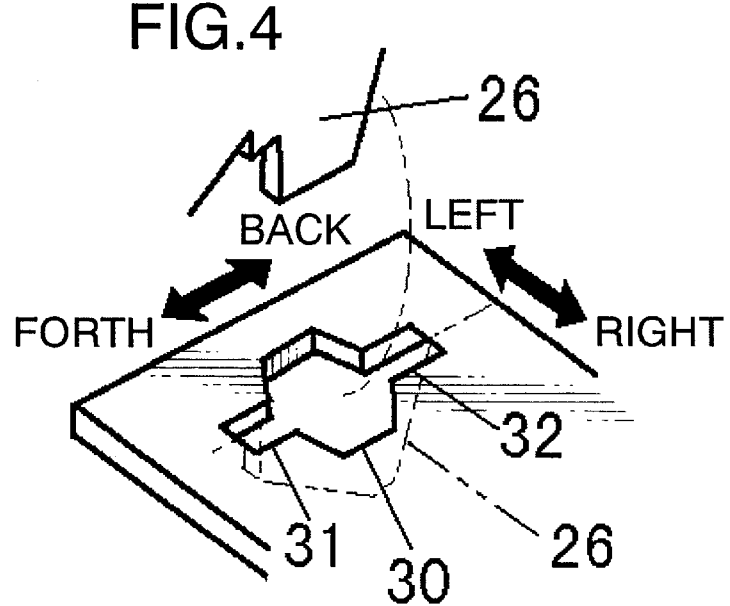
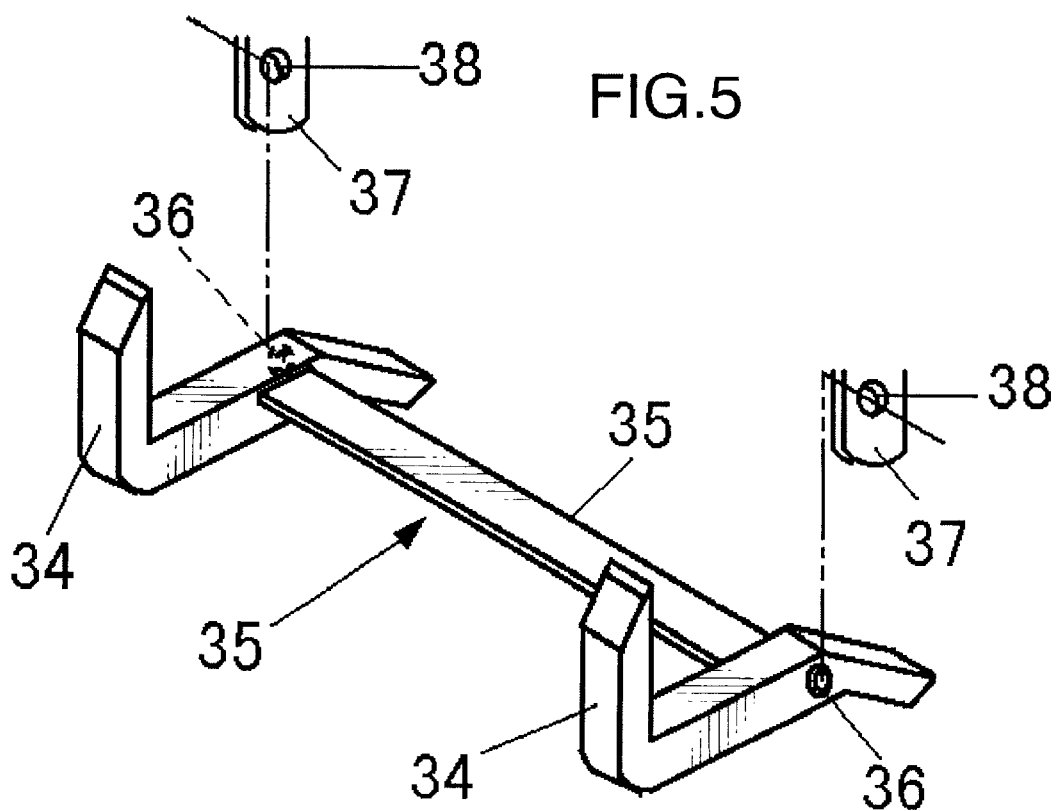

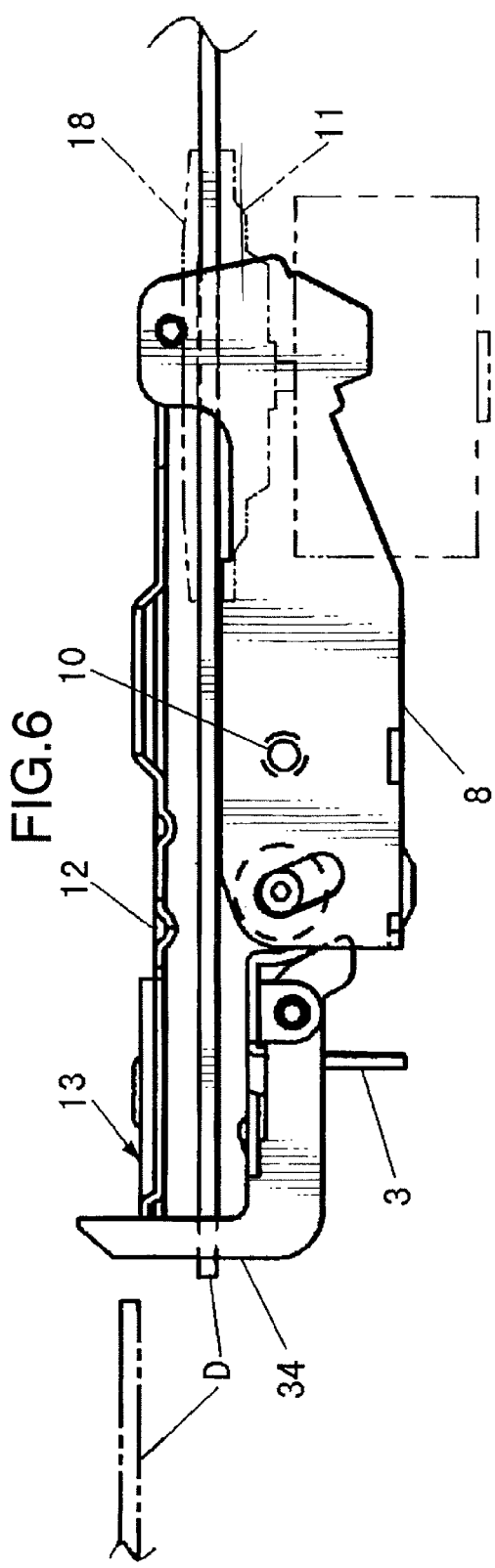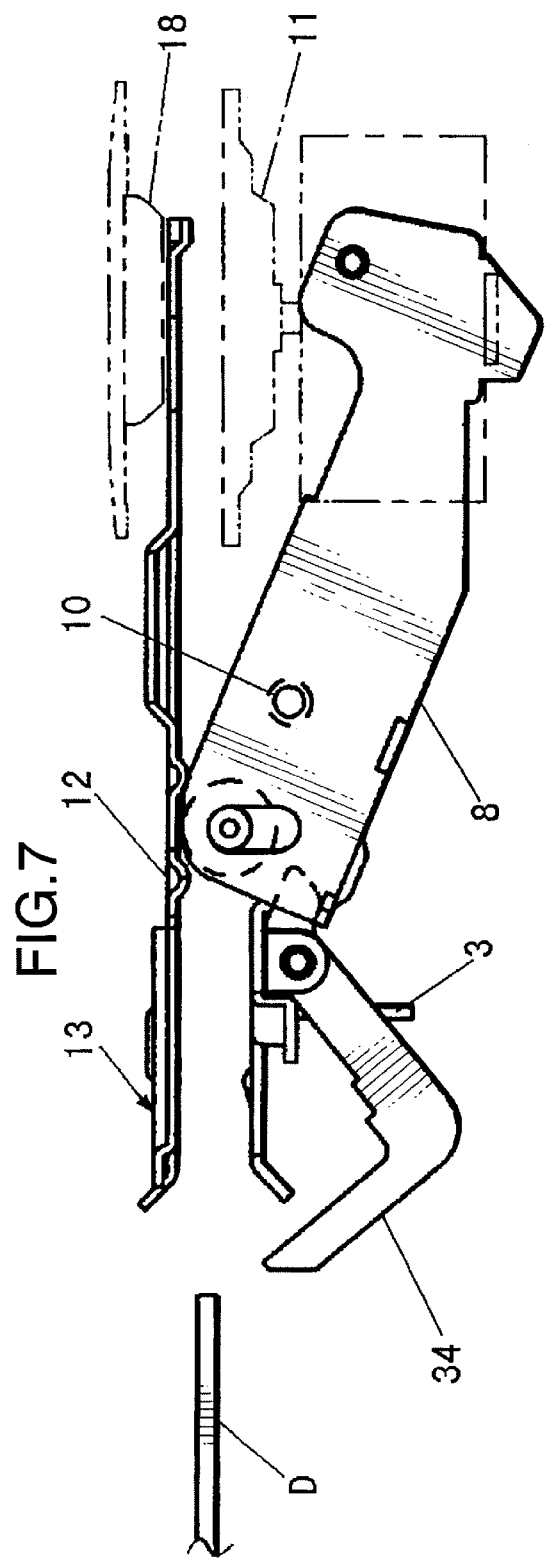

DISK PLAYER

BACKGROUND OF THE INVENTION

1. Field of the Invention

The present invention relates to a disk player in which a floating chassis is fixed or unfixed with respect to a main chassis by the movement of a roller holder which supports a disk carrier roller.

2. Description of the Related Art

In a disk player mainly for vehicles, a pickup, a turntable, a clamper and the like are mounted on the floating chassis supported in the main chassis in the floating condition, so that those pickup, turn table, clamper and the like are not affected by external vibrations. When the disk player is not in use, the floating chassis is fixed to the main chassis so as to make it easy to insert or take out a disk. Various devices have heretofore been proposed as a device for fixing the floating chassis to the main chassis.

The rock mechanism of a disk player for vehicles described in Japanese Unexamined Patent Publication No. 2000-48445 utilizes the movement of a roller holder which supports a disk carrier roller to fix the floating chassis to the main chassis.

That is to say, an "arm member" is positively rotated by means of a rise of the roller holder, and the positive movement of the arm member advances a "slide member" mounted on the main chassis so as to engage with the floating chassis. Due to this engagement, the floating chassis is fixed to the main chassis in the vertical direction. At this time, the slide member also engages with the roller holder, but since the roller holder is attached to the floating chassis, the floating chassis is fixed to the main chassis in the back and forth direction as well. Unfixing of the floating chassis from the main chassis is performed by the completely opposite movement.

With the above-described fixing device, the "aim member" is reciprocally rotated by making the roller holder move up and down, and the "slide member" is advanced or retreated by means of the rotation of the arm member so that the floating chassis is fixed or unfixed with respect to the main chassis. Therefore, the arm member and the slide member are required in addition to the roller holder in order to fix or unfix the floating chassis, which increases the number of parts. Since these members have to be connected and interlocked to each other, the construction becomes complicated, so as to increase the production cost.

SUMMARY OF THE INVENTION

In view of the situation, it is an object of the present invention to provide a disk player in which a floating chassis is fixed or unfixed with respect to a main chassis by the movement of a roller holder which supports a disk carrier roller, so as to reduce the number of parts, to simplify the construction and to decrease the production cost.

A disk player comprises a disk carrier roller, a roller holder and a floating chassis equipped with a turntable and a clamper (supported in a main chassis in the floating condition). The right and left side plates of the roller holder are rotatably mounted between the right and left side plates of the floating chassis to rotatably support the opposite ends of the disk carrier roller by the roller holder, such that the disk carrier roller is moved between an upper disk carrying position and a lower disk non-carrying position by means of the rotation of the roller holder. When the roller holder rotates to raise the disk carrier roller from the disk non-carrying position to the disk carrying position, the right and left side plates of the roller holder are engaged with a part of the main chassis from above to fix the floating chassis to the main chassis in the front and back directions as well as the right and left directions, and the roller holder further rotates about a fulcrum to raise the floating chassis, which makes at least one of the floating chassis and an arm of the clamper attached thereto abut against another part of the main chassis from below, to thereby fix the floating chassis to the main chassis in the vertical direction.

The disk carrier roller is rotatably supported by the roller holder such that the opposite ends thereof move independently in the directions of approaching and separating from the disk. When the opposite ends are energized respectively by a spring in the direction approaching the disk, the disk can be carried without any problem even if the disk is eccentrically inserted.

The right and left side plates of the roller holder engage with the part of the main chassis by fitting a convex portion provided in one of the part and the plates and concave portions provided in the other one of the part and the plates, which makes the construction simpler.

BRIEF DESCRIPTION OF THE DRAWING

The foregoing and additional features and characteristics of the present invention will become more apparent from the following detailed description considered with reference to the accompanying drawings in which like reference numerals designate like elements and wherein:

FIG. 3 is a side view showing the operation of inserting or eating out the disk;

FIG. 4 is a perspective view showing the relation between a convex portion of the roller holder and the concave portions of the main chassis;

FIG. 5 is a perspective view showing a double insertion preventing member;

FIG. 6 is a side view showing the interaction between the double insertion preventing member and the roller holder;

FIG. 7 is a side view showing the interaction between the double insertion preventing member and the roller holder.

DESCRIPTION OF THE PREFERRED EMBODIMENT

Figure 1:
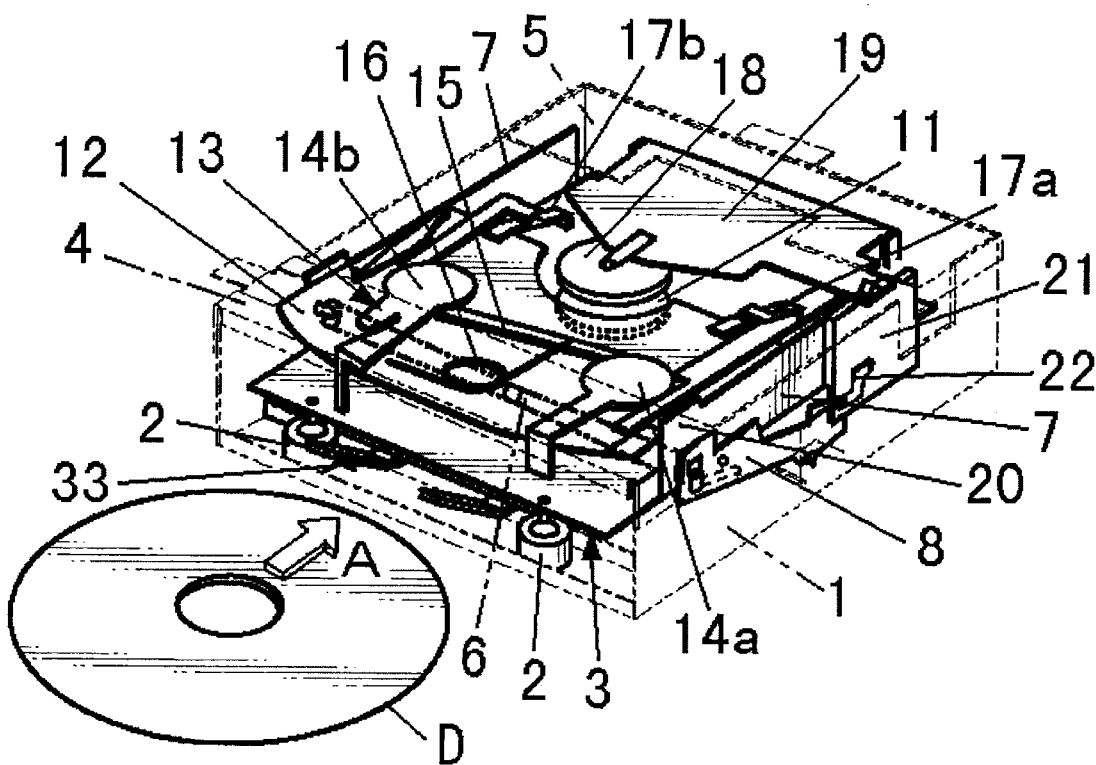
FIG. 1 is a schematic perspective view showing one embodiment of the present invention.

One embodiment of the present invention is described below with reference to the drawings. FIG. 1 is a perspective view showing the internal mechanism of a disk player, wherein a main chassis 1 on the outside is shown by a virtual line. A disk D is inserted in the direction of arrow A from the front side of the main chassis 1.

A floating chassis 3 is supported in the main chassis 1 in the floating condition via a plurality of resilient members 2. The main chassis 1 has a front top plate 4 and a rear top plate 5 on the upper part thereof, with the both top plates 4, 5 being generally separated from each other. A roller 6 (shown in a virtual line) for carrying the disk D is arranged at the front of the main chassis 1. The opposite ends of this roller 6 are rotatably supported by a roller holder 8, which is rotatably mounted to the right and left side plates 7 of the floating chassis 3.

Figure 2:
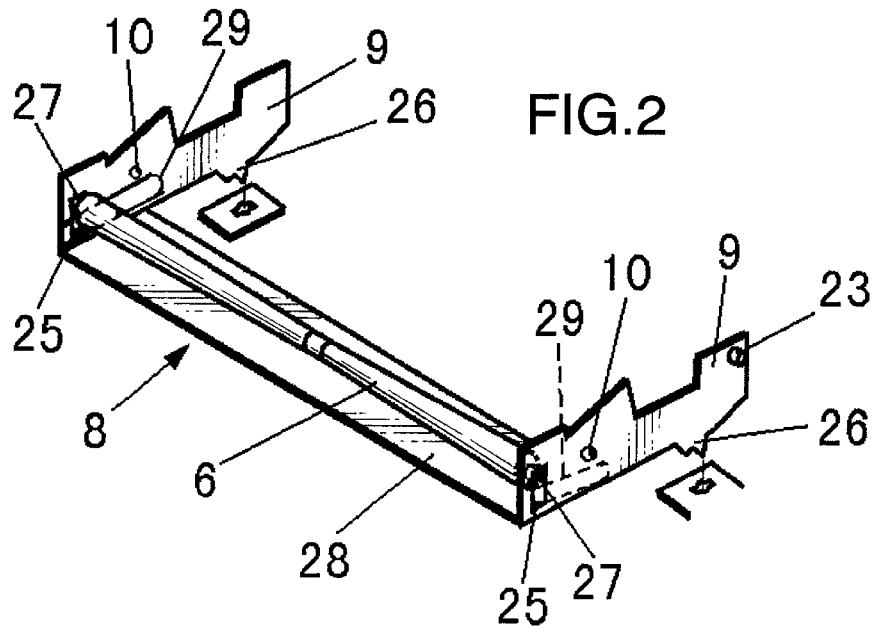
FIG. 2 is a perspective view showing a roller holder and the periphery thereof.

The roller holder 8 has right and left side plates 9, as shown in FIG. 2, and the right and left side plates 9 are respectively provided with an attachment hole 10, each attachment hole 10 being rotatably supported by the right and left side plates 7 of the floating chassis 3. The roller 6 moves between the upper disk carrying position and the lower disk non-carrying position, with the rotation of the roller holder 8. The floating chassis 3 is equipped with a turntable 11 (not shown) for rotating the disk D, a pickup (not shown) for playing back the recording information of the disk, a pickup drive (not shown) which drives the turntable 11, and the like.

Above the floating chassis 3, a guide plate 12 made of metal is provided. The disk D is carried by clamping the disk D by this guide plate 12 and the roller 6, and then by rotating the roller 6. The lower face of the guide plate 12 is a guide face contacting with the disk D, and a disk detection mechanism 13, which detects that the disk D, is inserted and activates the drive source of the roller holder 8, and the roller 6 is arranged on the upper face of the guide plate 12. This disk detection mechanism 13 controls the carried amount of the disk in accordance with the diameter of the inserted disk D.

The disk detection mechanism 13 comprises a pair of right and left detection arms 14a, 14b mounted on the upper face of the guide plate 12 so as to rotate in the horizontal direction. The space between the detection arms 14a and 14b is enlarged by the disk D. When the detection arms rotate about their respective fulcra (shown as "*" in FIG. 1), the disk detection mechanism 13 judges that the inserted disk has a large diameter or a small diameter according to the rotation amount of the arms.

The disk detection mechanism 13 further comprises a link member 15 which synchronizes the movement of the right and left detection arms 14a and 14b with each other, a spring 16 which energizes the detection arms 14a and 14b to a closing direction, and a pair of right and left restriction members 17a and 17b for small-diameter disks, which controls the carried amount of the disk depending on the diameter of the disk D.

The pair of restriction members 17a and 17b for small-diameter disks are mounted on the right and left sides in the rear part of the guide plate 12. When a small-diameter disk is inserted, the restriction members 17a and 17b for small-diameter disks are located on the carrier path of the disk to restrict the carried amount of the disk. When a large-diameter disk is inserted, the restriction members 17a and 17b are evacuated from the carrier path of the disk by means of a large rotation of the detection arms 14a and 14b.

A clamper 18 is arranged above the turntable 11. A clamper arm 19 is mounted at the rear of the floating chassis 3, so as to be able to rotate vertically. The clamper 18 is rotatably supported by this clamper arm 19 so as to load the disk D onto the turntable 11, with the downward rotation of the clamper arm 19.

FIG. 3A and FIG. 3B are right side views showing the mechanism of the disk player. As shown in these figures, a front edge portion 20 is provided at the front edge of the right and left side plates 7 of the floating chassis 3, and a cam plate 21 is mounted to the rear part of the right side plate so as to move in the back and forth directions. The cam plate 21 has a cam groove 22, for receiving a protrusion 23 provided in the roller holder 8. When the cam plate 21 moves back and forth, the protrusion 23 moves in the cam groove 22 such that the roller holder 8 rotates about the attachment hole 10. A slope 24 is provided on the upper face of the cam plate 21, such that a part of the clamper arm 19 is abutted against the slope 24 adequately. Therefore, with the back and forth movements of the cam plate 21, the clamper arm 19 rotates up and down about a contact 50 such that the clamper 18 approaches and separates from the turntable 11.

The relation between the roller holder 8 and the roller 6 is shown in FIG. 2. That is to say, the roller holder 8 has vertically long holes 25 at the front edges of the right and left side plates 9, and convex portions 26 at the rear lower edges thereof.

Shaft portions 27 at the opposite ends of the roller 6 are inserted into the long holes 25 in the right and left side plates 9, so that the shaft portions 27 at the opposite ends can freely move in the vertical direction along the long holes 25. A torsion spring 29 which energizes the roller 6 in the direction approaching the disk D, puts between the shaft portion 27 and the bottom plate 28 of the roller holder 8, respectively in the right and left sides.

As shown in FIG. 4, the bottom plate of the main chassis 1 has engagement holes 30. These engagement holes 30 have concave portions 31 and 32 in a form of a slit in the back and forth direction. When the roller holder 8 rotates about the attachment hole 10 in the clockwise direction in FIG. 2, each convex portion 26 is inserted into the engagement hole 30, as shown in the virtual line in FIG. 4, to fit into the concave portions 31, 32, such that the floating chassis 3 is fixed with respect to the main chassis 1 in the back and forth direction and the right and left direction. When the roller holder 8 rotates in the opposite direction, the convex portions 26 separate from the engagement holes 30 to release the fixation.

As shown in FIG. 3A and FIG. 3B, at the front edge of the main chassis 1, i.e., at the forward position of the roller holder 8, a double insertion preventing member 33 is provided in order to prevent double insertion of disks.

The double insertion preventing member 33 is, as shown in FIG. 5, right and left stopper portions 34 approximately in an L shape comprises being connected by a connecting portion 35, with the upper edge of the vertical portion in each stopper portion 34 is formed in a slope inclining forwards. Each boss portion 36 of the double insertion preventing member 33 is protruded at the center on the outer face of the horizontal portion in each stopper portion 34, and the rear edge of each horizontal portion is inclined downwards.

On the other hand, a pair of right and left supporting pieces 37 are suspended downwards from the floating chassis 3, and each boss portion 36 is fitted into a supporting hole 38 provided in each supporting piece 37, such that the double insertion preventing member 33 can be freely rotated in the vertical direction with respect to the floating chassis 3. This double insertion preventing member 33 is always energized in the clockwise direction by a spring (not shown). In the condition of the playback operation, as shown in FIG. 6, the vertical portions of the right and left stopper portions 34 are located on the insertion line of the disk D to restrict insertion of another disk.

In the ejected condition of the disk D, as shown in FIG. 7, since the roller holder 8 rotates in the clockwise direction, the rear edge of each horizontal portion at the upper edge in the cam groove 22 is pushed by the roller holder 8 from below to rotate in the counterclockwise direction to open the insertion path.

Figure 8:
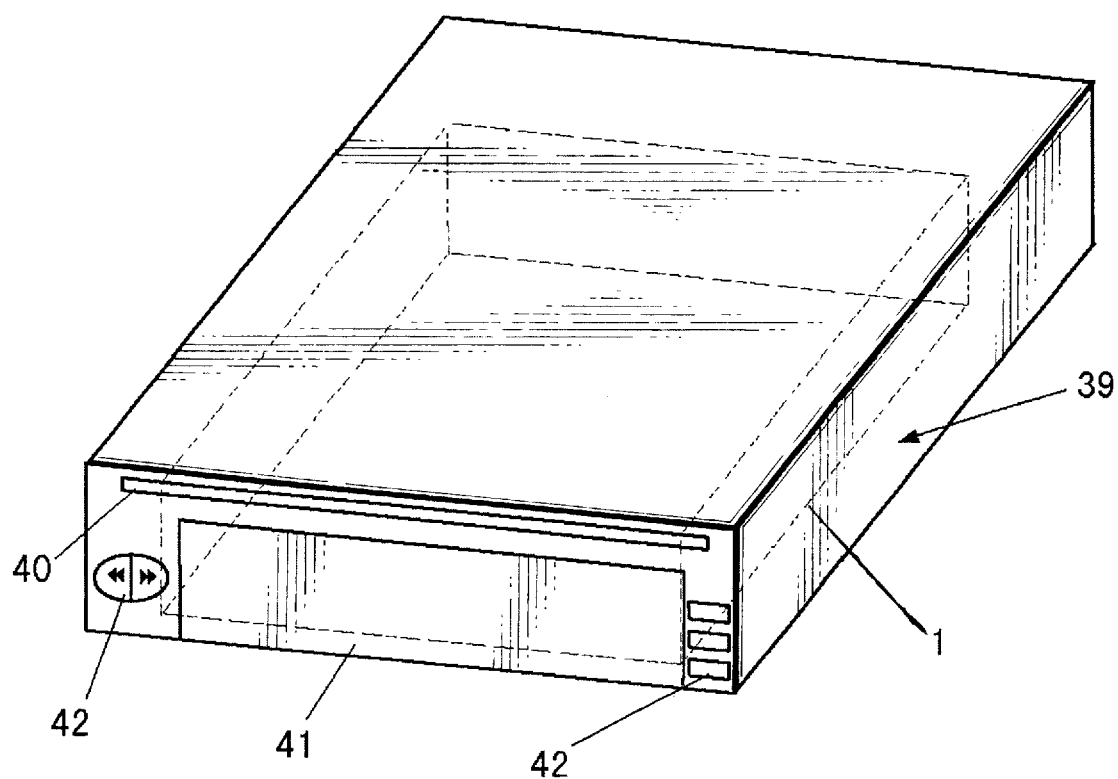
FIG. 8 is a perspective view of a case of a disk player.

FIG. 8 shows the case of the disk player of this embodiment. On the front face of the case 39, a disk insertion slot 40 is provided on the uppermost part thereof, and a display 41 is provided below the disk insertion slot 40, and operation buttons 42 and the like are arranged at the right and left sides of the display 41. In the disk player for vehicles, in particular, the size of the case 39 is standardized.

The operation in this embodiment is described below.

At first, the operations of loading the disk D onto the turntable 11, and playback, fixing the floating chassis 3 to the main chassis 1, and ejecting the disk D are described with reference to FIG. 3A to FIG. 3D as follows.

When the playback operation is performed, as shown in FIG. 3A, the cam plate 21 is moved forward towards the main chassis 1 by the largest amount, and the protrusion 23 of the roller holder 8 is located in the horizontal portion at the upper edge in the cam groove 22. The convex portion 26 of the roller holder 8 is separated upward from the engagement hole 30, and the floating chassis 3 is supported in the main chassis 1 via the resilient members 2 in the floating condition. The clamper arm 19 is in the descending position detached from the slope 24 of the cam plate 21, such that the disk D is clamped between the clamper 18 and the turntable 11.

In this condition, when the ejection operation of the disk D is performed, a loading motor (not shown) is activated to move the cam plate 21, as shown in FIG. 3B, rearward of the main chassis 1 (to the right side in the figure). Hence, the protrusion 23 of the roller holder 8 moves in the ramp of the cam groove 22 in the cam plate 21. As a result, the roller holder 8 rotates about the attachment hole 10 as a fulcrum in the clockwise direction such that the roller 6 supported by the roller holder 8 abuts against the disk D from below. At this time, the slope 24 of the cam plate 21 abuts against a part of the clamper arm 19 to push up the clamper arm 19 such that the clamper 18 is separated from the turntable 11.

When the cam plate 21 further moves rearwards, as shown in FIG. 3C, the roller holder 8 further rotates in the clockwise direction, such that the convex portion 26 is fitted into the concave portions 31, 32 of the engagement hole 30 so as to fix the floating chassis 3 to the main chassis 1 in the back and forth direction and the right and left directions. At this time, the roller 6 supported by the roller holder 8 presses the disk D from below by means of the energizing force of the torsion spring 29.

As shown in FIG. 3D, when the cam plate 21 moves rearwards as much as possible, and the roller holder 8 generally rotates in the clockwise direction, the position of the attachment hole 10 is raised about the engagement position of the concave portion 32 and the convex portion 26 as a fulcrum so as to raise the whole floating chassis 3. Thereby, the front edge of the floating chassis 3 abuts against the front top plate 4 from below, and the clamper arm 19 abuts against the rear top plate 6 from below. That is to say, at least one of the floating chassis 3 and the rigid member (i.e., a clamper arm) attached thereto abuts against the part of the main chassis 1 from below. As a result, the floating chassis 3 is fixed to the main chassis 1 also in the vertical direction. At this time, a part of the clamper arm 19 is raised up to the top end of the slope 24, and the clamper 18 is completely separated from the disk D. The disk D is clamped between the roller 6 and the guide plate 12, and the roller 6 is rotated by the loading motor to eject the disk D.

Next, the operation from the condition that the floating chassis 3 is fixed to the main chassis 1 and the disk D is ejected to the playback operation of the disk D is described.

In the condition that the floating chassis 3 is fixed to the main chassis 1, the roller 6 is pressed against the guide plate 12 by the torsion spring 29. As shown in FIG. 3D, when the disk D is inserted between the roller 6 and the guide plate 12, the disk detection mechanism 13 detects this and activates the loading motor such that the roller 6 rotates to carry the disk D to the space between the turntable 11 and the clamper 18. The cam plate 21 is also driven by the loading motor to move forward the main chassis 1 (to the left side in the figure).

With this forward movement of the cam plate 21, the roller holder 8 rotates to make the floating chassis 3 come down. Through the conditions shown in FIG. 3C and FIG. 3B, the convex portion 26 of the roller holder 8 is separated from the concave portions 31 and 32 of the main chassis 1, as shown in FIG. 3A. The floating chassis 3 is then supported in the main chassis 1 via the resilient members 2 in the floating condition. The clamper arm 19 is also detached from the slope 24 of the cam plate 21 and comes down such that the disk D is clamped between the clamper 18 and the turntable 11.

As described above, in the condition that the disk D is loaded, if the user erroneously tries to load another disk, as shown in the virtual line in FIG. 6, such erroneous insertion can be prevented by the vertical portions of the right and left stopper portion 34 on the insertion line of the disk.

According to this embodiment as described above, the roller holder 8 is engaged with a part of the main chassis 1 to fix the floating chassis 3 in the back and forth direction and the right and left directions. The roller holder 8 is further rotated to make at least one of the floating chassis 3 and the rigid member 19 attached thereto abut against the other part of the main chassis 1 so as to fix the floating chassis 3 to the main chassis 1 in the vertical direction. As a result, the parts of the disk player are reduced and a simple construction is manufactured at a low cost.

When the disk D is taken out, since the floating chassis 3 is fixed at the uppermost position in the main chassis 1, as shown in FIG. 8, the disk insertion slot 40 is provided at the uppermost portion on the front face of the case 39. As a result, a large space for the display 41 is ensured.

Moreover, the opposite ends of the roller 6 are supported by the roller holder 8 independently movably, and each end is energized by the spring toward the disk. Therefore, even if the disk is eccentrically inserted, the right and left taper faces of the roller 6 abut against the disk D uniformly, to carry the disk without any problem.

Furthermore, since the engagement between the roller holder 8 and the main chassis 1 is performed by fitting the concave and convex portions, the mechanism can be further simplified.

In this embodiment, fitting of the concave and convex portions is performed by providing the convex portion 26 on the roller holder 8 side, and the concave portions 31, 32 on the main chassis 1 side. However, it may be performed by providing the concave portion on the roller holder 8 side, and the convex portion on the main chassis 1 side.

Also in this embodiment, the front edge of the floating chassis 3 is made to abut against the front top plate 4 from below, and the clamper arm 20 is made to abut against the rear top plate 5 from below, such that the floating chassis 3 is fixed to the main chassis 1 in the vertical direction. However, the present invention is not limited thereto. A part of the floating chassis 3 may be made to abut against the front and rear top plates 4 and 5 from below, or the front upper corner of the roller holder 8 may be made to abut against the front top plate 4 from below. In short, similar effects can be obtained by making at least one of the floating chassis and the rigid member attached thereto abut against the main chassis from below.

According to the present invention, in the disk player in which the floating chassis is fixed or unfixed with respect to the main chassis in the vertical, back and forth, and right and left directions, by utilizing the roller holder which supports the disk carrier roller, the roller holder is engaged with a part of the main chassis to fix the floating chassis in the back and forth, right and left direction, and the roller holder further rotates to make at least one of the floating chassis and the rigid member attached thereto abut against the other part of the main chassis, to thereby fix the floating chassis to the main chassis in the vertical direction. As a result, there can be provided a disk player having a reduced number of parts and a simple construction, which can be manufactured at a low cost. Further, when the disk is taken out, the floating chassis is fixed at the uppermost position in the main chassis such that the disk insertion slot can be provided at the uppermost portion on the front face of a cabinet to ensure a large space for the display.

Moreover, since the opposite ends of the disk carrier roller are supported by the roller holder independently movably, and each end portion is energized by a spring toward the disk direction, even if the disk is eccentrically inserted, the disk can be carried without any problem.

Furthermore, since the engagement of the roller holder with the main chassis is performed by fitting the convex portion and concave portions, the construction becomes simpler.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A disk player comprising a disk carrier roller, a roller holder, and a floating chassis supported in a main chassis in the floating condition, said floating chassis includes a turntable, a clamper, and right and left side plates, wherein right and left side plates of the roller holder are rotatably mounted between the right and left side plates of the floating chassis to rotatably support two opposite ends of the disk carrier roller by the roller holder such that the disk carrier roller is moved between an upper disk carrying position and a lower disk non-carrying position by means of the rotation of the roller holder, and wherein when the roller holder rotates to raise the disk carrier roller from the disk non-carrying position to the disk carrying position, the right and left side plates of the roller holder are engaged with a part of the main chassis from above to fix the floating chassis to the main chassis in the front and back directions, and the right and left directions, and the roller holder further rotates about a fulcrum to raise the floating chassis, which makes at least one of the floating chassis and an arm of the clamper attached thereto abut against another part of the main chassis from below so as to fix the floating chassis to the main chassis vertically.

2. The disk player according to claim 1, wherein the disk carrier roller is rotatably supported by the roller holder such that the opposite ends thereof move independently in directions approaching and separating from a disk, and the opposite ends thereof are energized by at least one spring, respectively, in the direction approaching the disk.

3. The disk player according to claim 1, wherein the right and left side plates of the roller holder engage with the part of the main chassis by fitting at least one convex portion of one of the part and the plates in at least one concave portion of the other one of the part and the plates.

* * * * *